Patented Nov. 29, 1938

2,138,184

UNITED STATES PATENT OFFICE 2,138,184

TRANSPARENT ORGANIC DERIVATIVES OF CELLULOSE

Herbert E. Martin, Cumberland, Md., assignor to Celanese Corporation of America, a corporation of Delaware No Drawing. Application January 22, 1936, Serial No. 60,268

1 Claim. (Cl. 106—40)

This invention relates to the manufacture and preparation of organic derivatives of cellulose that, when formed into articles such as films and plastics, produce a transparent article free from haze and cloudy spots.

An object of the invention is the economic production of a highly transparent article containing organic derivatives of cellulose, which article is free from haze and cloudy spots. Another object of the invention is the production of organic derivatives of cellulose that are free from haze forming material. Other objects of the invention will appear from the following detailed description.

Organic derivatives of cellulose, such as cellulose acetate, as ordinarily made contain certain colored constituents or ingredients that tend to impair their usefulness in the making of plastics, films, filaments and the like, particularly where transparency and freedom from color are desired. Thus, when a thick sheet or block of a plastic composition containing such organic derivatives of cellulose is made, the same has a distinct greenish brown color, is of poor transparency and sometimes contains distinct cloudy spots. For certain purposes, articles made of organic derivatives of cellulose, though not containing distinct cloudy spots, may nevertheless contain sufficient haze forming material to impair their usefulness.

I have found that the discoloring and haze forming compounds may be substantially removed from the organic derivatives of cellulose by filtering a solution of same under such conditions that the organic derivatives of cellulose in solution are in an extremely fine state of subdivision. The filtration is preferably performed while the organic derivative of cellulose is dissolved in the solution, diluted with an excess of solvent, from which articles are to be formed.

In accordance with my invention, I prepare organic derivatives of cellulose of reduced color and containing substantially no haze forming compounds by filtering an easily flowable solution of the organic derivative of cellulose, preferably in the presence of a filter-aid. Also, in accordance with my invention, I filter a solution of an organic derivative of cellulose in such a manner that a precipitation and redissolving of the organic derivative of cellulose does not occur between the filtration of the solution and the shaping of the organic derivative of cellulose into the desired article. However, if it is desired, the organic derivative of cellulose may be precipitated from the solution after filtering provided that a non-aqueous precipitant is employed, or the organic derivative of cellulose may be dried by freeing the same of solvent by evaporation of the solvent.

While other derivatives of cellulose, such as cellulose nitrate, may be treated in accordance with this invention, I prefer to treat organic derivatives of cellulose, such as organic esters of cellulose and cellulose ethers. Examples of the organic esters of cellulose are cellulose acetate, cellulose formate, cellulose propionate and cellulose butyrate, while examples of the ethers of cellulose are ethyl cellulose, methyl cellulose and benzyl cellulose.

The organic derivative of cellulose may be formed by any suitable method. For instance, cellulose acetate may be formed by treating cellulose with acetic anhydride in the presence of a catalyst and a suitable diluent or solvent, such as acetic acid. The cellulose acetate thus formed may be subjected to a hydrolysis or ripening treatment to produce the desired solubility characteristics therein. The ripening or hydrolysis may be performed by allowing the cellulose acetate, still dissolved in the liquors formed during esterification, to stand for a period of time under suitable temperature conditions. By this process cellulose acetate, which when formed is soluble in chloroform, may be made soluble in acetone. The other esters of cellulose may be formed in a similar manner.

Although I have found that satisfactory results may be obtained by filtering a solution of the derivatives of cellulose at any time during their manufacture, I prefer to filter the derivatives of cellulose after they have been precipitated from the solution in which they were formed, stabilized and redissolved in a solution from which they are to be shaped in an article. This second solution, for the purpose of describing this invention, may be termed the "working solution". For instance, the working solution for forming filaments of cellulose acetate would be a solution of cellulose acetate dissolved in acetone or other suitable solvent, which solution is extruded through suitable orifices.

The solution of organic derivatives of cellulose at the time of filtration may be of any suitable concentration producing an easily flowable solution. For cellulose acetate, a suitable solution may consist of from 2 to 18 parts by weight of cellulose acetate to 100 parts by weight of a solvent, such as acetone. The amount of organic derivative of cellulose present in the solution should be sufficiently small so that the same is in an extremely fine state of subdivision. Although any of the easily flowable solutions will give beneficial results, I prefer to use a solution containing about 3 to 6 parts by weight of the organic derivative of cellulose to 100 parts by weight of the solvent. As stated above, during the time of filtration it is preferable to have the organic derivative of cellulose dissolved in the solvent that is to be employed in forming the organic derivative of cellulose into articles. For the majority of uses, such a dilute solution of the organic derivative of cellulose is not economical to handle. Therefore, after the filtration a part of the solvent may be flashed-off from the solution or otherwise removed to increase the percentage of organic derivative of cellulose to the proper working conditions.

The dilute solution of the organic derivative of cellulose may be filtered through any convenient type of the many filter presses or continuous rotating filters. As filtering medium fine cloth, paper, wood pulp or other fibrous material may be used in single or multiple layers. A number of filtrations may be made through the same type of medium or through a different type of medium if desired. For instance, two or six or more filtrations may be made through the same or different mediums. To the solution may be added filter-aids such as carbon black, silica gel, fuller's earth or other types of granular or fibrous material which will aid filtration or absorb color from the solutions. In a preferred embodiment of the invention from 0.1 to 10.%, based on the weight of the organic derivative of cellulose, of powdered silica gel is employed as a filter aid. If desired, the filter cloth or pad may be pre-coated with a silica gel or other filter-aid. As an aid in preventing the development of color in the articles due to corrosion, these dilute solutions may be treated before or during filtration with metals such as, for example, by mixing powdered metals with the solution prior to filtration or by passing the dilute solution through filter pads made of metal wool.

The treatment with metals may be made by passing the solution of the organic derivative of cellulose through a column containing the metals in a form presenting a large surface area. Although any suitable metal, such as zinc, copper, nickel, cobalt, chromium, lead, tin, silver, cadmium, iron, aluminum or other metals may be employed alone or in series, I prefer to form with two or more metals a voltaic cell or couple. The metals may be present in the column in the form of plates, powder, beads, rings, shavings, curls, turnings, etc. The most efficient column is produced by the use of metal wool.

After filtration of the dilute solution with or without treatment with filter-aids and/or metals, the concentration of the solution may be increased. This concentration of the solution may be effected by allowing a part of the solution to evaporate as in a flashing operation or by distilling off, with or without the use of the vacuum, a part of the solvent. In some instances, it is preferable to carry out the filtration of the solution at an elevated temperature, that is, from 24° C. to about 54° C. When employing such elevated temperatures and in using readily volatile solvents, such as acetone, the concentration of the solution may be easily effected by allowing the solution to flow for a short distance through an evaporator which is adapted to remove vapors from the solution.

If desired, the organic derivative of cellulose may be recovered in a dry condition by precipitating the organic derivatives of cellulose from the solution by means of a non-aqueous precipitant or by removing the solvent by evaporation in a filament or film forming operation. Examples of suitable non-aqueous precipitants are carbon tetrachloride, isopropyl ether and diethyl ether. The removal of the solvent by means of evaporation is preferred to the use of precipitants, as the resulting organic derivative of cellulose, when later shaped into an article, has a higher haze number if no precipitant has been employed.

By the above method, organic derivatives of cellulose articles may be made having a haze number above 50, whereas organic derivatives of cellulose prepared without this treatment have haze numbers of approximately 30.

The haze number referred to above is obtained by tests in a hazeometer. The sample to be tested has minimum dimensions of 3½ x 3½" and has a standard thickness of 20/1000 of an inch, which sample is placed in a sample holder. The hazeometer comprises a projection lamp of 500 watts which throws a strong beam of light through a condenser lens onto this sample. A metal plate with an opening of 3" is placed in front of the sample, and the lamp and lens are placed so that the test piece is evenly illuminated through this opening. The light scattered by the test piece projects on a ground glass plate which is placed at a distance of 5½" from the center of the test piece and at a 45° angle to the surface of the sample and the direction of the applied light. A second plate of ground glass is illuminated by a movable light source consisting of 21 candle power low voltage bulb. The illumination of these two ground glass plates is compared in a common ocular lens. The relative position of the two ground glass plates is such that the optical path of the rays of light have the same length. The projection lamp and low voltage comparison lamp do not emit light of the same shade. Therefore, a filter of orange red shade may be interposed in the path of the rays coming from the two ground glass plates in order to make them comparable. The comparison lamp is mounted on a holder adapted to move along a track. An indicator connected with the movable holder moves along a meter stick on which the distance of the lamp from the second ground glass plate may be read. The distance of the comparison lamp from the ground glass plate, as read off on the meter stick, is called the haze reading or haze number of the sample. Thus, the higher the haze number of a sample the more free of haze it is. For reducing haze readings taken on samples of a thickness other than 20/1000 of an inch the following formula can be used $$H_{20} = H_d \sqrt{\frac{d}{20}} = 0.224 H_d \sqrt{d}$$

where $d$=thickness of sample in 1/1000 of an inch and $H_d$=haze reading on sample of thickness $d$.

I have found that by filtering solutions of cellulose acetate as specified above and forming the same directly into an article, the article will have a haze reading of above 50, while a similar article formed of an untreated sample of the same cellulose acetate will have a haze reading of below 30. If the filtered sample is precipitated with a non-aqueous precipitant, then redissolved and formed into an article, the article will have a haze reading of about 40, while if the same sample is precipitated with an aqueous precipitant the haze reading will be as low as before filtering, i. e., below 30.

The derivative of cellulose prepared in accordance with my invention may be formed into films and plastics containing plasticizers in which case it may be desirable to have the plasticizer present during the filtration. The derivative of cellulose may be dissolved in a volatile solvent therefor and may have incorporated therein plasticizers such as triacetin, diethyl tartrate, dibutyl tartrate, diethyl phthalate, triphenyl phosphate or other suitable plasticizers. Any suitable amount of plasticizer may be incorporated in the solution depending upon the use for which the solution is to be used. For instance, in making plastics, films, tubes and the like, from 200 to 100 parts of plasticizer may be employed. Solutions containing the organic derivative of cellulose may be formed into sheets, blocks, tubes, rods or other articles by any suitable process. Another important application of this invention is in the making of molding powders containing a purified derivative of cellulose in finely divided condition together with plasticizers and a little or substantially no volatile solvents, which molding powders may be molded under heat and pressure to the desired shape. Films to be employed as a base for photographic or cinematographic films or other purposes may also be used for this material. The purified derivative of cellulose may also be used for making lacquers, particularly clear or light colored lacquers.

In order to further illustrate this invention, but without being limited thereto, the following example is given:

*Example*

Cellulose acetate having an acetyl value of 53.5 and an acetone viscosity of 21.9 and a haze number of 28.2 is dissolved in 20 times its weight of acetone. To this solution is added 6%, on the weight of the cellulose acetate, of a powdered silica gel and the solution is filtered through cellulose fiber. The filtration is carried out under pressure using compressed air up to 20 or 25 pounds per square inch. A part of the solvent is flashed off from the filtered solution such that the concentration of cellulose acetate is increased to 20% on the weight of the solvent. This solution is then formed into an article. The article formed has a haze number of 51.6.

It is understood that the foregoing detailed description is given merely by way of illustration and that many variations may be made therein without departing from the spirit of my invention.

Having described my invention, what I desire to secure by Letters Patent is:

In a method of producing articles from solutions of cellulose acetate of high concentration, which articles are free from haze, powder spots and haze forming materials the steps of forming a solution comprising from 3 to 6 parts by weight of cellulose acetate and 100 parts by weight of a solvent therefor, treating said solution with metal wool, filtering said solution at an elevated temperature, concentrating the filtered solution to the required high concentration, and forming articles from said concentrated solution.

HERBERT E. MARTIN.

CERTIFICATE OF CORRECTION.

Patent No. 2,138,184.   November 29, 1938.

HERBERT E. MARTIN.

It is hereby certified that error appears in the printed specification of the above numbered patent requiring correction as follows: Page 2, second column, line 74, for the word "about" read above; and that the said Letters Patent should be read with this correction therein that the same may conform to the record of the case in the Patent Office.

Signed and sealed this 10th day of January, A. D. 1939.

Henry Van Arsdale (Seal)   Acting Commissioner of Patents.

ing will be as low as before filtering, i. e., below 30.

The derivative of cellulose prepared in accordance with my invention may be formed into films and plastics containing plasticizers in which case it may be desirable to have the plasticizer present during the filtration. The derivative of cellulose may be dissolved in a volatile solvent therefor and may have incorporated therein plasticizers such as triacetin, diethyl tartrate, dibutyl tartrate, diethyl phthalate, triphenyl phosphate or other suitable plasticizers. Any suitable amount of plasticizer may be incorporated in the solution depending upon the use for which the solution is to be used. For instance, in making plastics, films, tubes and the like, from 200 to 100 parts of plasticizer may be employed. Solutions containing the organic derivative of cellulose may be formed into sheets, blocks, tubes, rods or other articles by any suitable process. Another important application of this invention is in the making of molding powders containing a purified derivative of cellulose in finely divided condition together with plasticizers and a little or substantially no volatile solvents, which molding powders may be molded under heat and pressure to the desired shape. Films to be employed as a base for photographic or cinematographic films or other purposes may also be used for this material. The purified derivative of cellulose may also be used for making lacquers, particularly clear or light colored lacquers.

In order to further illustrate this invention, but without being limited thereto, the following example is given:

*Example*

Cellulose acetate having an acetyl value of 53.5 and an acetone viscosity of 21.9 and a haze number of 28.2 is dissolved in 20 times its weight of acetone. To this solution is added 6%, on the weight of the cellulose acetate, of a powdered silica gel and the solution is filtered through cellulose fiber. The filtration is carried out under pressure using compressed air up to 20 or 25 pounds per square inch. A part of the solvent is flashed off from the filtered solution such that the concentration of cellulose acetate is increased to 20% on the weight of the solvent. This solution is then formed into an article. The article formed has a haze number of 51.6.

It is understood that the foregoing detailed description is given merely by way of illustration and that many variations may be made therein without departing from the spirit of my invention.

Having described my invention, what I desire to secure by Letters Patent is:

In a method of producing articles from solutions of cellulose acetate of high concentration, which articles are free from haze, powder spots and haze forming materials the steps of forming a solution comprising from 3 to 6 parts by weight of cellulose acetate and 100 parts by weight of a solvent therefor, treating said solution with metal wool, filtering said solution at an elevated temperature, concentrating the filtered solution to the required high concentration, and forming articles from said concentrated solution.

HERBERT E. MARTIN.

CERTIFICATE OF CORRECTION.

Patent No. 2,138,184.  November 29, 1938.

HERBERT E. MARTIN.

It is hereby certified that error appears in the printed specification of the above numbered patent requiring correction as follows: Page 2, second column, line 74, for the word "about" read above; and that the said Letters Patent should be read with this correction therein that the same may conform to the record of the case in the Patent Office.

Signed and sealed this 10th day of January, A. D. 1939.

Henry Van Arsdale (Seal)  Acting Commissioner of Patents.